United States Patent [19]
Ami et al.

[11] Patent Number: 5,579,410
[45] Date of Patent: Nov. 26, 1996

[54] REGION FILLING CIRCUIT AND METHOD OF FILLING A REGION

[75] Inventors: Yasuhiro Ami; Tadahiko Komatsu, both of Hyogo, Japan

[73] Assignee: Mitsubishi Electric Semiconductor Software Corporation, Hyogo, Japan

[21] Appl. No.: 262,051

[22] Filed: Jun. 17, 1994

Related U.S. Application Data

[63] Continuation-in-part of Ser. No. 130,496, Oct. 1, 1993, abandoned.

[30] Foreign Application Priority Data

Oct. 9, 1992  [JP]  Japan ................................ 4-271484

[51] Int. Cl.⁶ ........................................................ G06K 9/46
[52] U.S. Cl. ......................... 382/203; 395/118; 395/141
[58] Field of Search .............................. 382/305, 256, 382/199, 274, 204, 203; 395/129, 130, 131, 132, 141, 118; 345/118

[56] References Cited

U.S. PATENT DOCUMENTS

| | | | |
|---|---|---|---|
| 4,758,965 | 7/1988 | Liang et al. | 395/129 |
| 4,791,582 | 12/1988 | Ueda et al. | 395/129 |
| 4,815,009 | 3/1989 | Blatin | 364/518 |
| 4,887,228 | 12/1989 | Robert | 395/129 |
| 4,897,805 | 1/1990 | Wang | 395/129 |
| 4,901,251 | 2/1990 | Starti | 395/129 |
| 4,914,729 | 4/1990 | Omori et al. | 395/141 |
| 4,958,300 | 9/1990 | Ueda | 364/521 |
| 5,016,001 | 5/1991 | Minagawa et al. | 395/142 |
| 5,048,109 | 9/1991 | Bloomberg et al. | 382/164 |
| 5,272,764 | 12/1993 | Bloomberg et al. | 382/164 |

FOREIGN PATENT DOCUMENTS

| | | |
|---|---|---|
| 4019660 | 6/1989 | Germany . |
| 53-41017 | 10/1978 | Japan . |
| 1-237775 | 9/1989 | Japan . |
| 2-45889 | 2/1990 | Japan . |
| 4-50896 | 2/1992 | Japan . |

*Primary Examiner*—Yon J. Couso
*Attorney, Agent, or Firm*—Lowe, Price, LeBlanc & Becker

[57] ABSTRACT

In the region filling circuit of this invention, if only the starting position and the end position of the filling region rare supplied from outside, the inversion of bits in the filling area including the starting position and the end position where the whole bits are possibly not the subject of filling can be executed by hardware independently of a CPU, thereby to shorten the filling time and consequently reducing the time when the CPU is occupied during the filling.

3 Claims, 4 Drawing Sheets

REGION FILLING CIRCUIT AND METHOD OF FILLING A REGION

This application is a continuation-in-part of U.S. Ser. No. 08/130,496 filed Oct. 1, 1993 now abandoned.

BACKGROUND OF THE INVENTION

1. Field of the Invention

This invention relates to a circuit for use in a display, a printer or the like, which is adapted to realize the region filling algorithm of a character pattern and a figure pattern composed of dots by hardware.

2. Description of Related Art

Conventionally, a region in a character pattern and a figure pattern has been filled according to a plurality of region filling algorithms by means of software (Japanese Patent laid-Open Application Nos. 1-237775 (1989)), 2-45889 (1990) and Japanese Patent Publication No. 53-41017 (1978).

FIG. 1 is a flow chart of an example of the region filling algorithm.

The coordinate of pixel in the plotting region of a screen etc. is computed (S1), based on which both the starting address of a memory for storing the data of the filling region and the bit data for the first filling are formed while from the bit at the plotting starting position to the least significant bit in the filling area sectioned for every word or the like is rendered "1" (S2).

In the first filling, the bit data for the first filling obtained in the step S2 and the data of the starting address of the memory area where the bit data of the pattern to be filled is stored are subjected to an exclusive OR operation, thereby to perform filling (S3).

It is detected whether the memory address corresponding to the filling region is the filling end address (S4). If the memory address is the end address, the filling is terminated, whereas if the memory address has not reached the end address, the filling of a next area is conducted (S5).

The bit data for the second filling and afterwards is set to be al "1". The filling is achieved by performing an exclusive OR operation of the bit data of the second filling and afterwards and the data of a next address to the storing area of the first filling data.

As described above, in the conventional method to realize the region filling algorithm by means of software, the filling should be repeatedly carried out by software, thus taking a long time for the filling.

Although Japanese Patent, Application Laid-Open No. 4-50896 (1992) reveals a plotting circuit which realizes the region filling algorithm as above by hardware, the plotting circuit requires a process to develop the outline data turned from a vector to a dot image by a CPU.

SUMMARY OF THE INVENTION

This invention has been devised to solve the above-described disadvantages, and has for its first object to provide a region filling circuit which realizes the region filling algorithm by hardware, thereby to shorten the filling time.

This object is solved by a region filling circuit according to claim 1.

This invention provides a region filling circuit which regulates a filling region based only on the plotting starting position and the plotting end position supplied from outside and auto-matically fills the filling region, making a process unnecessary to develop the vector data of the outline to dots by a CPU and shortening the time required for the filling and the occupying time of the CPU during the filling.

The above and further objects and features of the invention will more fully be apparent from the following detailed description with accompanying drawings.

DESCRIPTION OF THE PREFERRED EMBODIMENTS

A preferred embodiment will be discussed hereinbelow with reference to the accompanying drawings.

Figure 1:
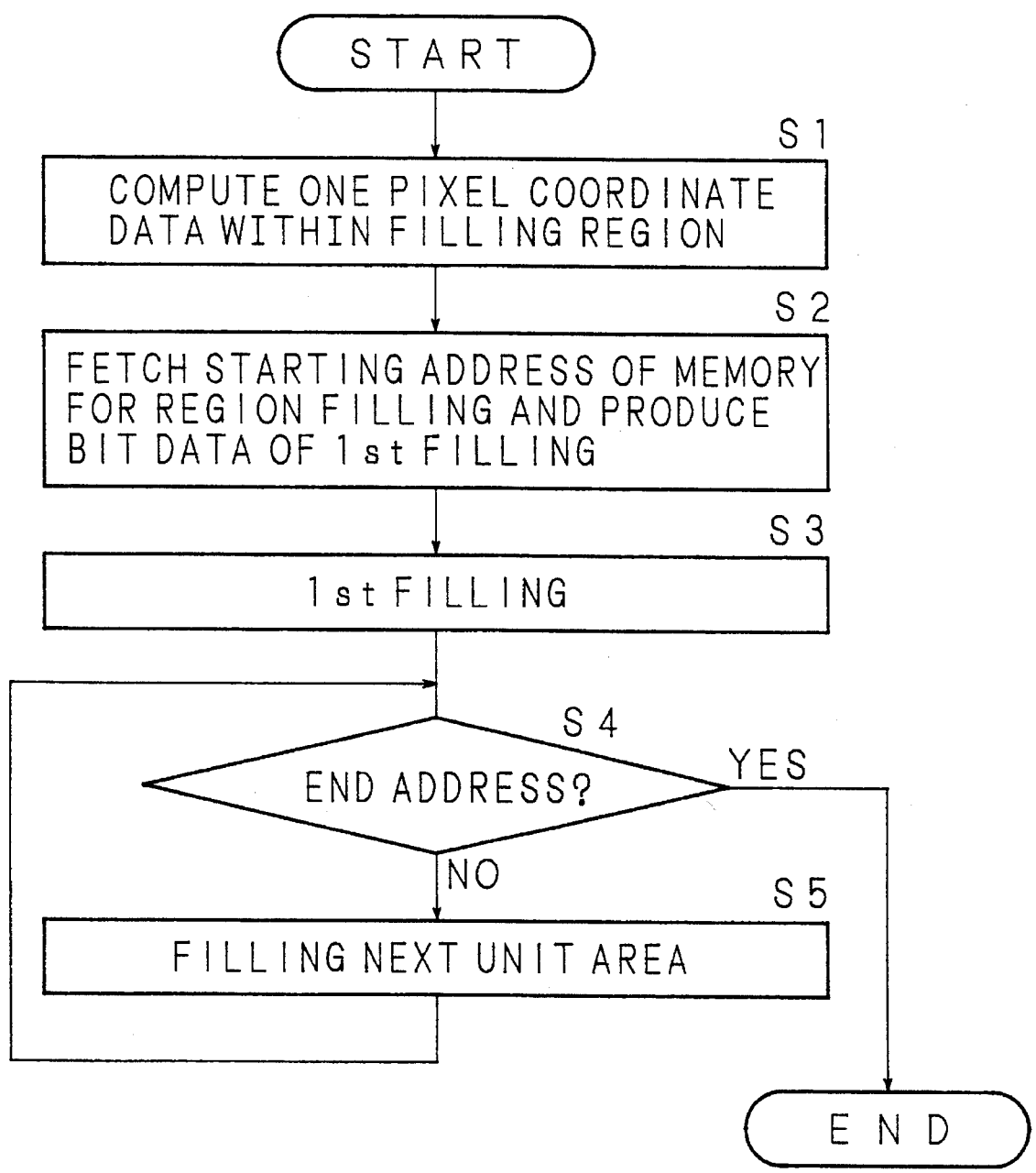
FIG. 1 is a flow chart of an example of a filling algorithm.
Figure 2:
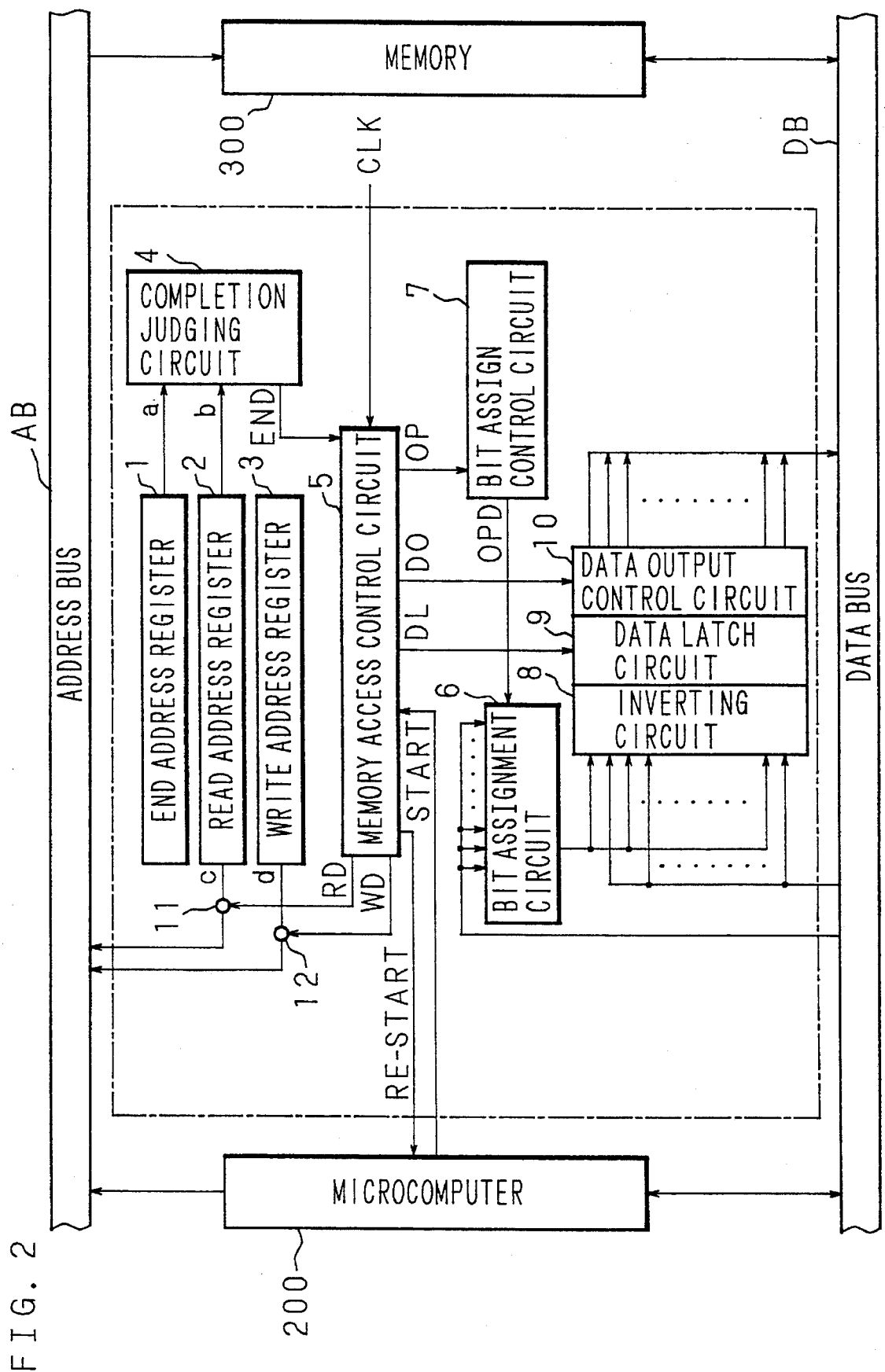
FIG. 2 is a block diagram showing the constitution of a region filling circuit of one embodiment.

FIG. 2 is a block diagram of the constitution of a region filling circuit according to the embodiment, in which the region filling circuit is encircled by a chain line.

When a microcomputer executes a region filling command included in the plotting program, it feeds the coordinate data of the filling starting position and the filling end position via a data bus to the region filling circuit. It is to be noted here that the filling is sequentially carried out from left to right and from up to down of the plotting pattern. At the same time, the microcomputer generates a starting signal START to actuate the region filling circuit, so that the right to use an address bus and the data bus is passed to the region filling circuit.

A memory has a capacity to store the plotting data in the plotting region of a predetermined size, e.g., on frame having addresses allocated sequentially for every 8-bit word. When the whole system of FIG. 2 is activated, and after all the characters or figures are completely filled, the value of every bit is cleared to "0" in order to perform re-filling.

The constitution of the region filling circuit will be depicted below.

An end address register 1, a read address register 2 and a write address register 3 respectively store the reading end address of the data from the memory, reading starting address of the data from the memory and writing starting address to the memory. Moreover, each of the read address register 2 and the write address register 3 has a function to increment the address by "1" every time the read address register 2 outputs the read address via a signal line b or the write address register 3 generates the write address to the memory via a signal line d and the address bus. The initial value of each register 1, 2, 3 is set by the plotting program executed by the microcomputer.

An end decision circuit 4 compares the read address input from the read address register 2 via the signal line b with the reading end address input through the signal line a from the end address register 1. When the addresses are agreed with each other, the end decision circuit 4 determines that the filling is completed, and outputs a reading end signal END to a memory access control circuit 5.

When the memory access control circuit 5 turns a reading signal RD to "H" to turn ON a switch circuit 11, the reading cycle is started, so that the read address register 2 generates the read address through a signal line c to the memory via the address bus. Meanwhile, when the memory access control circuit 5 generates an "H" write signal WD to turn ON a switch circuit 12, the writing cycle is started and the write address register 3 outputs the write address through the signal line d and the address bus to the memory.

The memory access control circuit 5 frequency-demultiplies or processes a system clock CLK, with generating a control signal for access to the memory. Moreover, the memory access control circuit 5 supplies a pulse signal OP to inform the first or last filling to a bit assign control circuit 7 in response to the input of the starting signal START from the microcomputer or the reading end signal END from the end decision circuit 4, and also outputs a signal RE-START to notify the end of the filling to the microcomputer in accordance with the input of the reading end signal END from the end decision circuit 4.

The memory access control circuit 5 further feeds a timing signal DL for latching of data to a data latch circuit 9 to be described later, as well as a timing signal DO for outputting of data to a data output control circuit 10 to be described later.

A bit assignment circuit 6 holds the assigning data of the first filling bits to set the whole bits at the right side from the filing starting position in the filling area to "H" and the other bits to "L" based on the coordinate data of the filling starting position supplied from the microcomputer whereby 8 bits is a unit of the filling.

When a word which possibly include bits not to be filled, for example, in the first filling area including the filling starting position and the last filling area including the filling end position is to be filled, the bit assign control circuit 7 outputs a signal OPD to the bit assignment circuit 6 as the pulse signal OP is input from the memory access control circuit 5, thereby making the output of the filling bit assigning data which depending on the bits to be filled can include "H", "L" or both from the bit assignment circuit 6 valid. On the other hand, in order to fill the second word and afterwards whose bits are all to be filled, the bit assign control circuit 7 makes the output from the bit assignment circuit 6 invalid, in other words, controls all of the bit outputs to "H".

However, in the case where the whole bits of the starting word are to be filled, the output of the bit assignment circuit 6 is invalidated to change all the bit outputs to "H".

An inverting circuit 8 is composed of 8-bit exclusive OR gates and makes an exclusive OR operation of the filling bit assigning data generated from the bit assignment circuit 6 and the bit data of one word read out from the memory of the address designated by the read address register 2, thereby to invert the bit data read from the memory, in case the respective bit of the filling bit assigning data is "H", and output to the data latch circuit 9.

The data latch circuit 9 latches the inverted bit data from the inverting circuit 8 in accordance with the output timing of the signal DL from the memory access control circuit 5. Subsequently, the data output control circuit 10 outputs the inverted bit data of the data latch circuit 9 to the data bus in accordance with the output timing of the signal DO from the memory access control circuit 5.

A process to fill the region by the region filling circuit of the above-described structure will be described with reference to a timing chart of various kinds of signals in FIG. 3. For brevity's sake, in the instant embodiment, the filling bits are assigned only at the filling starting position and the filling end position.

In accordance with the running plotting program, the word address of a memory in which the bit data of the filling starting position is stored is set in the read address register 2, and the word address of a memory where the bit data of the filling end position is stored is set in the end address register 1. Meanwhile, the starting word address is set in the write address register 3.

The bit assignment circuit 6 holds the assigning data of the bits to be filled on the basis of the coordinate data of the filling starting position supplied from the microcomputer so that all the bit outputs rightward from the filling starting position are turned "H" and the other bit outputs become "L".

The microcomputer generates the signal START to the memory access control circuit 5 by executing the filling command included in the plotting program, thereby driving the region filling circuit and transferring the right to use the address bus and the data bus to the region filling circuit.

The memory access control circuit 5 changes the read signal RD from "L" to "H" when the signal START is input thereto. As a result, the switch circuit 11 is turned ON. Accordingly, the reading cycle is started, and the read address is output to the memory from the read address register 2 through the signal line c and the address bus, whereby the data of the address assigned by the read address is read out into the inverting circuit 8 via the data bus.

The memory access control circuit 5 outputs the pulse signal OP to the bit assign control circuit 7 in reply to the input of the signal START. When the pulse signal OP is input, the bit assign control circuit 7 determines it the first filling and turns the signal OPD from "L" to "H". The signal OPD is maintained at "H" while the read data is input to the inverting circuit 8 from the memory.

When the signal OPD becomes "H", the bit assignment circuit 6 generates the assigning data of the filling bits to the inverting circuit 8. The inverting circuit 8 in turn performs an exclusive OR operation of the read data from the memory and the assigning data of the filling bits from the bit assignment circuit 6 to invert the read data, i.e., to invert the bits of the read data, if the corresponding bit of the assigning data is "H". The data is output from the inverting circuit 8 to the data latch circuit 9.

The data latch circuit 9 latches the data from the inverting circuit 8 with the timing when the signal DL rises to "H". When the read signal RD falls from "H" to "L", the switch circuit 11 is turned OFF to terminate the reading cycle of data. At the completion of the reading cycle, the read address register 2 outputs the read address stored therein to the end decision circuit 4 via the signal line b, with incrementing the storing address by "1".

Subsequently, when the write signal WD is changed from "L" to "H", the switch circuit 12 is turned ON to start the writing cycle of data. The write address stored in the write address register 3 is, via the signal line d and the address bus output to the memory.

The data output control circuit 10 outputs the data from the data latch circuit 9 to the data bus with the timing when the signal DO rises to "H". The data is eventually written into the memory address assigned by the write address through the data bus.

When the write signal WD falls from "H" to "L", the switch circuit 12 is turned OFF to terminate the writing cycle of the data, and the write address register 3 increments the write address stored therein by "1".

The above sequence of operations is repeated until the address of the end address register 1 agrees with that of the read address register 2. The end decision circuit 4 outputs the reading end signal END to the memory access control circuit 5 when the addresses are agreed with each other. The memory access control circuit 5 generates the signal RESTART to inform the termination of the filling after carrying out the data writing cycle. As a result, the using right of the address bus and the data bus is transferred to the microcomputer.

The region filling circuit of this invention may be built in a peripheral circuit of a one-chip microcomputer.

The word length is not limited to 8 bits, but may be 16 or 32 bits.

Further, although there are separately provided the read address register 2 and the write address register 3 in the embodiment, it may be so designed that both the read address and the write address be assigned by one register if the filling data is to be overwritten in the same address as the read address.

The filling direction is not restricted to be such as in the foregoing embodiment.

An explanation of a filling processing is given below by using an example shown in the FIGS. 4 (a)–(h).

Data for plotting ΔABC is primarily only the coordinate data (vector data) of A, B, C, as shown in FIG. 4 (a). The line segments AB, BC, CA are formed by a software based on the data of these points A, B, C. That image data is stored in the memory 300.

With respect to filling the line including the point A, 8-bit data (=1 word, =8 dots) is given to the bit assignment circuit 6 and further "OPD" is given. This data is given to the inverting circuit 8. When the point A is the forth from the left in these 8 dots, the data of the bit assignment circuit 6 is "LLLHHHHH".

The inverting circuit 8 is composed of 8-bit exclusive OR gates. When an input of exclusive OR is "H", data of other inputs is inverted. Therefore, the right portion from the point A is inverted (filled). Words following this line, since the output of the bit assignment circuit 6 becomes all "H" by disappearance of "OPD", are all inverted and filled in the inverting circuit 8.

Figure 3:
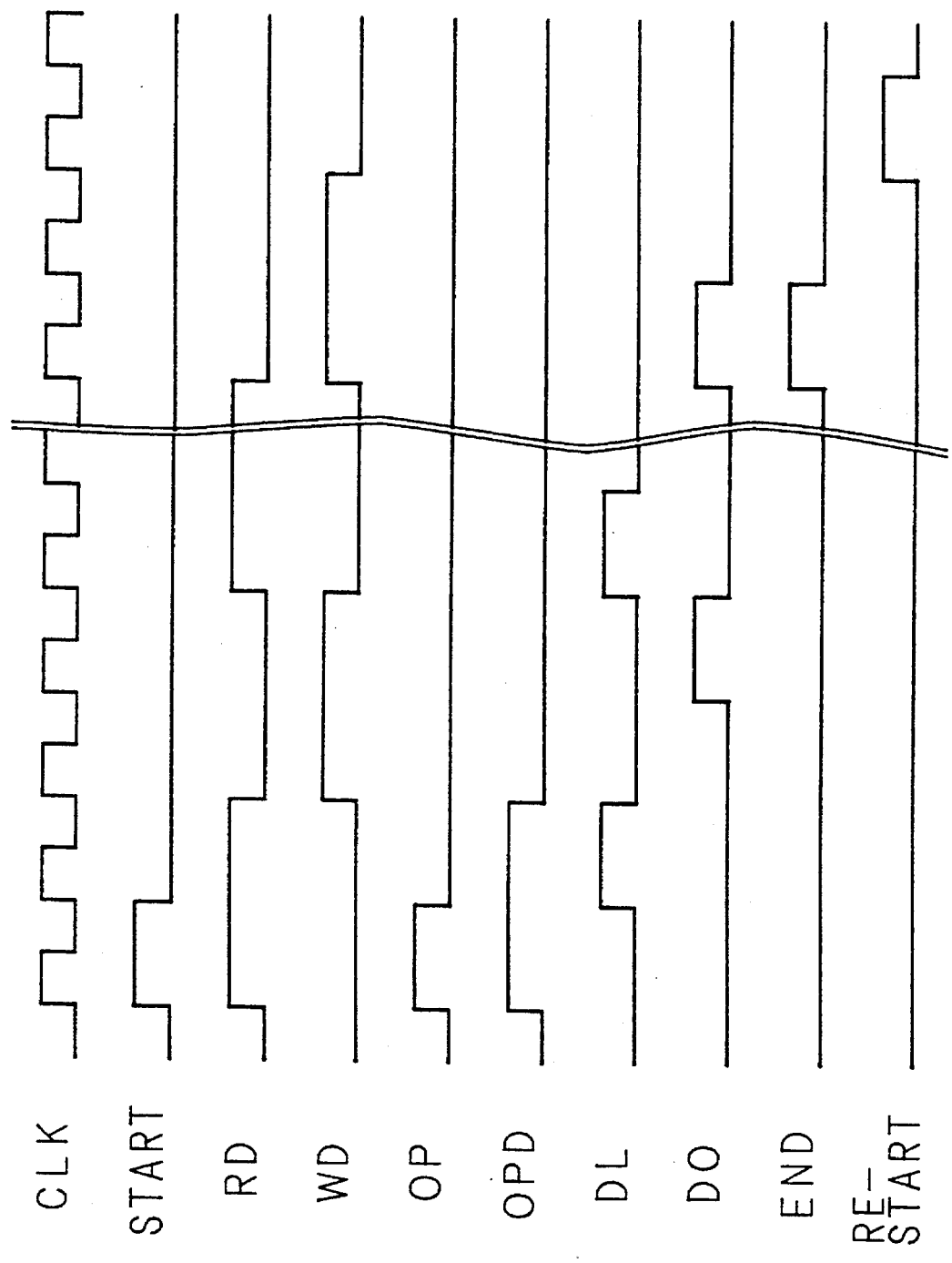
FIG. 3 is a timing chart of various kinds of signals in the region filling circuit of the embodiment.
Figure 4A:
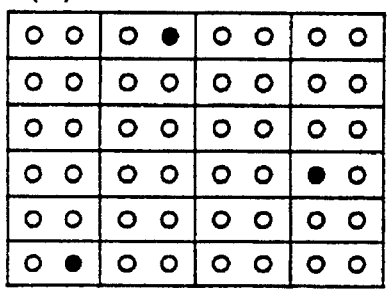
FIGS. 4 (*a*) to 4 (*h*) are diagrams for an explanation of a filling processing.
Figure 4B:
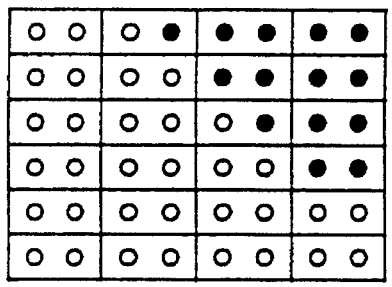
Figure 4C:
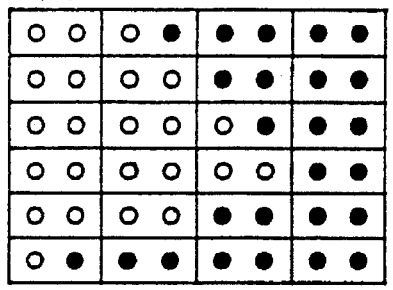
Figure 4D:
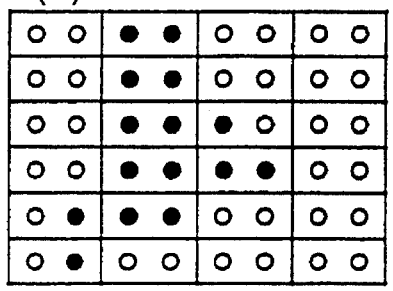
Figure 4E:
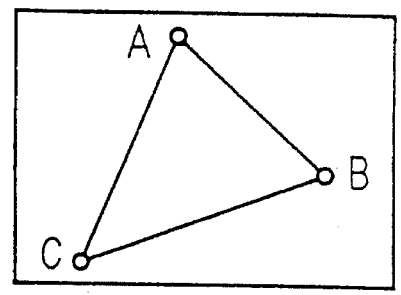
Figure 4F:
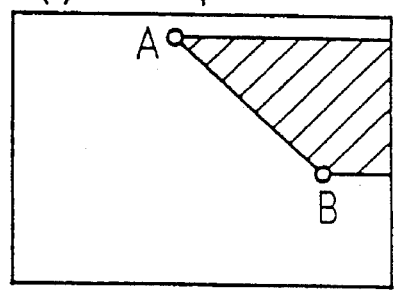
Figure 4G:
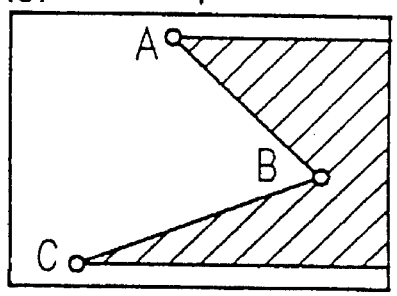
Figure 4H:
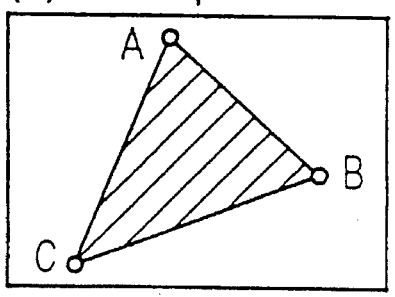

FIG. 3 shows the sequence of pulses (signals) in a line such as above.

Also with respect to the second line, "OP" and "OPD" appear in the word including this line and its crossing point with the line segment AB, data such as "LLLLHHHH" is output from the circuit 6 and the right portion from the above crossing point is filled.

FIG. 4 (g) shows the state that processing has been performed in the same way up to the line including the point C (FIGS. 4 (a)–(c) and FIGS. 4 (e)–(g)).

Next, same processing is performed concerning the line segment AC.

Logic is same as in the case of the line segments AB, AC. Regarding the data in the memory 300, since the left portion from the line segments AB, AC is white and the right portion therefrom is black, the portion from the segment AC to the segment AB (or BC) is inverted from white to black, while the right portion from the line segment AB (or BC) is inverted from black to white.

As a result, filling such as shown in FIG. 4 (h) is completed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A region filling circuit to be connected to a microcomputer and a memory for filling a pattern through inversion of bit data corresponding to each of a plurality of pixels forming said pattern, comprising:

a bit assignment circuit for holding assigning data of bits to be filled in a filling area on the basis of coordinate data of a filling starting position and a filling end position provided by said microcomputer, each bit of the assigning data to be filled being at either a first bit level or a second bit level;

a register means for storing address data specifying the filling area including address data of the filling starting position and address of the filling end position;

a circuit for maintaining the bit level of each bit of the assigning data to be filled at its respective bit level when the filling starting position and the filling end position are included in the filling area, and outputting the bit level of each bit of the assigning data to be filled at the first bit level when the filling starting position and the filling end position are not included in the filling area;

means for reading out bit data from the memory in response to address data from said registers means;

an inverting circuit for performing an exclusive OR operation between the bit data read out from memory and the assigning data of bits to be filled from the bit assignment circuit, the bit level of each bit of the read out bit data being inverted when the bit level of the corresponding bit of the assigning data is at the first bit level;

means in the register means for sequentially incrementing the address data specifying the filling area stored in the plurality of registers beginning with the address data of the filling starting position; and a decision circuit for comparing each sequentially incremented address data with the address data of the filling end position and determining a completion of filling when the comparing indicates correspondence.

2. The region filling circuit according to claim 1, wherein said region filling circuit is included in a peripheral circuit of a single chip micro-computer.

3. A method of filling a region using a circuit connected between a microcomputer and a memory, comprising the steps of:

holding assigning data of bits to be filled in a filling area on the basis of coordinate data of a filling starting position and a filling end position provided by the microcomputer, each bit of the assigning data to be filled being at either a first bit level or a second bit level;

storing address data specifying the filling area including address data of the filling starting position and address of the filling end position;

maintaining the bit level of each bit of the assigning data to be filled at its respective bit level when the filling starting position and the filling end position are included in the filling area, and outputting the bit level of each bit of the assigning data to be filled at the first bit level when the filling starting position and the filling end position are not included in the filling area;

reading out bit data from the memory in response to the address data;

inverting the bit level of each bit of the read out bit data when the bit level of the corresponding bit of the assigning data is at the first level;

sequentially incrementing the address data specifying the filling area stored in the plurality of registers beginning with the address data of the filling starting position; and comparing each sequentially incremented address data with the address data of the filling end position and determining a completion of filling when the comparing indicates correspondence.

* * * * *